(12) United States Patent
Tomasson et al.

(10) Patent No.: US 7,513,549 B2
(45) Date of Patent: Apr. 7, 2009

(54) VEHICLE CENTER CONSOLE

(75) Inventors: Kris Tomasson, Corona del Ma, CA (US); Freeman Thomas, Laguna Beach, CA (US); Matthew A. Hill, Southam (GB)

(73) Assignee: Ford Global Technologies, LLC, Dearborn, MI (US)

( * ) Notice: Subject to any disclaimer, the term of this patent is extended or adjusted under 35 U.S.C. 154(b) by 421 days.

(21) Appl. No.: 11/327,805

(22) Filed: Jan. 6, 2006

(65) Prior Publication Data

US 2007/0158966 A1 Jul. 12, 2007

(51) Int. Cl.
*B60R 7/04* (2006.01)

(52) U.S. Cl. ...................... 296/24.34; 296/70

(58) Field of Classification Search .............. 296/24.34, 296/70, 24.46, 37.8, 37.12; 224/483, 542, 224/564; 312/237
See application file for complete search history.

(56) References Cited

U.S. PATENT DOCUMENTS

| | | | | |
|---|---|---|---|---|
| 3,356,409 A * | 12/1967 | Belsky et al. | ............ | 296/24.34 |
| 4,738,481 A | 4/1988 | Watjer et al. | | |
| 4,934,750 A * | 6/1990 | Eichler et al. | .............. | 296/37.8 |
| 5,112,094 A * | 5/1992 | Kribs | ......................... | 296/37.8 |
| 5,492,068 A * | 2/1996 | McKee | ......................... | 108/44 |
| 5,863,089 A * | 1/1999 | Ignarra et al. | .............. | 296/37.8 |
| 6,394,525 B1 | 5/2002 | Seibold | | |
| 6,419,314 B1 * | 7/2002 | Scheerhorn | ............ | 297/188.19 |
| 6,719,367 B2 * | 4/2004 | Mic et al. | .............. | 297/188.19 |
| 6,851,736 B1 * | 2/2005 | Klopp et al. | ............... | 296/37.8 |
| 7,029,049 B2 * | 4/2006 | Rockafellow et al. | ....... | 296/37.8 |
| 7,188,882 B2 * | 3/2007 | Dry | ........................... | 296/37.8 |
| 2003/0197392 A1* | 10/2003 | Clark et al. | ................ | 296/24.1 |
| 2005/0230993 A1* | 10/2005 | Dry | ........................... | 296/37.8 |
| 2005/0248169 A1* | 11/2005 | Clark et al. | .............. | 296/24.34 |
| 2007/0176449 A1* | 8/2007 | Kukucka et al. | ......... | 296/24.34 |
| 2007/0296234 A1* | 12/2007 | Sturt et al. | ................ | 296/24.34 |
| 2008/0079278 A1* | 4/2008 | Rajappa et al. | ........... | 296/24.34 |

FOREIGN PATENT DOCUMENTS

FR 2549787 A3 * 2/1985

* cited by examiner

*Primary Examiner*—Jason S Morrow
(74) *Attorney, Agent, or Firm*—Frank A. MacKenzie; Brooks Kushman P.C.

(57) ABSTRACT

A vehicle center console. The console includes a cantilevered body having an upper surface, which includes one or more upper center console features. The console also includes a lower surface including one or more lower center console features. The lower surface is disposed vertically apart from at least a portion of the upper surface such that a vehicle occupant has access to the one or more upper and lower center console features.

16 Claims, 4 Drawing Sheets

VEHICLE CENTER CONSOLE

BACKGROUND OF THE INVENTION

1. Field of the Invention

One aspect of the present invention generally relates to a vehicle center console, and more specifically, a cantilevered center console.

2. Background Art

Center consoles have become a standard feature in vehicle interiors. The center console typically includes cup holders for holding beverage containers, storage compartments for storing items, and switches and/or buttons for controlling vehicle features.

The center console typically has a generally boxy shape, wherein the lower side is mounted to the vehicle floor. According to such a configuration, the outer surface of the lower side is in contact with the vehicle floor. The opposing inner surface of the lower side is often inaccessible to the vehicle occupant. As a result, vehicle designers cannot place features, e.g. cup holders, switches and/or buttons on this surface due to this accessibility issue.

In light of the foregoing, what is needed is a vehicle center console having upper and lower surfaces for features, e.g. switches, cup holders, etc. What is also needed is a vehicle center console having a cantilevered body for providing the before-mentioned upper and lower surfaces.

SUMMARY OF THE INVENTION

According to one aspect of the present invention, a vehicle center console having upper and lower surfaces for features, e.g. switches, cup holders, etc. is provided. According to another aspect of the present invention, a vehicle center console having a cantilevered body for providing the before-mentioned upper and lower surfaces is disclosed.

In a first embodiment of the present invention, a vehicle center console is disclosed. The console includes a cantilevered body having an upper surface, which includes one or more upper center console features. The console also includes a lower surface including one or more lower center console features. The lower surface is disposed vertically apart from at least a portion of the upper surface such that a vehicle occupant has access to the one or more upper and lower center console features.

According to a second embodiment of the present invention, a vehicle center console is disclosed. The console includes a cantilevered body having an upper surface, which includes one or more upper center console features. The upper surface includes a first inclined surface inclined at a first angle relative to a reference plane and a second inclined surface inclined at a second angle relative to the reference plane. The first angle is greater than the second angle. The console also includes a lower surface including one or more lower center console features. The lower surface is disposed vertically apart from at least a portion of the upper surface such that a vehicle occupant has simultaneous access to the one or more upper and lower center console features.

In a third embodiment of the present invention, a vehicle center console is disclosed. The console includes a cantilevered body having an upper surface, which includes one or more upper center console features. The cantilevered body includes a supported end and a cantilevered end. Moreover, the cantilevered body projects towards the vehicle rear from the supported end to the cantilevered end. The console also includes a lower surface including one or more lower center console features. The lower surface is disposed vertically apart from at least a portion of the upper surface such that a vehicle occupant has access to the one or more upper and lower center console features.

The above and other objects, features, and advantages of the present invention are readily apparent from the following detailed description of the best mode for carrying out the invention when taken in connection with the accompanying drawings.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompany drawings which:

DETAILED DESCRIPTION OF EMBODIMENTS OF THE PRESENT INVENTION

As required, detailed embodiments of the present invention are disclosed herein. However, it is to be understood that the disclosed embodiments are merely exemplary of the invention that may be embodied in various and alternative forms. Therefore, specific functional details described herein are not to be interpreted as limiting, but merely as a representative basis for the claims and/or as a representative basis for teaching one of ordinary skill in the art to variously employ the present invention.

Except where otherwise expressly indicated, all numerical quantities in this description indicating dimensions are to be understood as modified by the word "about" in describing the broadest scope of the invention. Practice within the numerical limits stated is generally preferred. Also, unless expressly stated to the contrary, the first definition of an acronym or other abbreviation applies to all subsequent uses herein of the same abbreviation and applies mutatis mutandis to normal grammatical variations of the initially defined abbreviation; and, unless expressly stated to the contrary measurement of a dimension is determined by the same technique as previously or later referenced for the same property.

Figure 1:
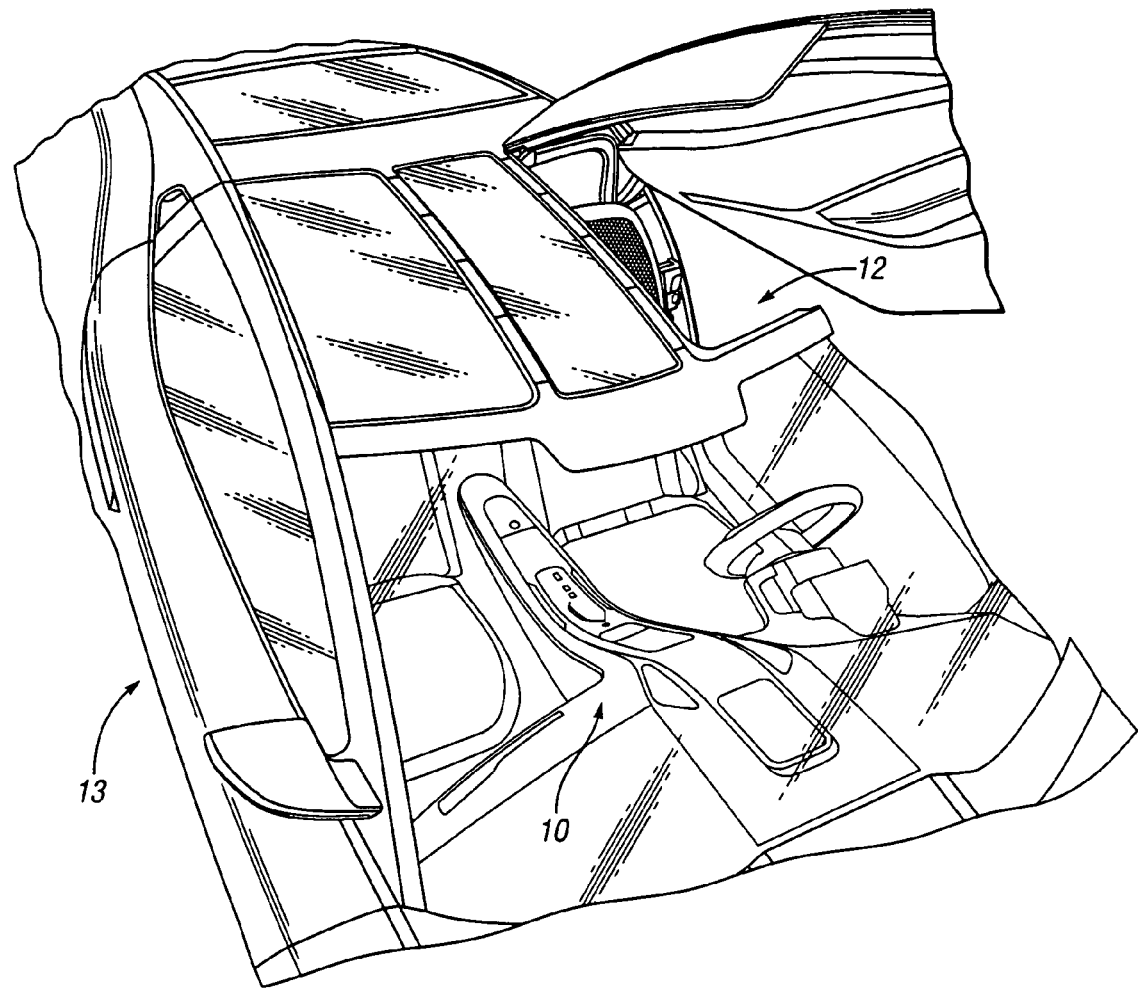
FIG. 1 is a perspective, top view of a center console situated within a vehicle cabin according to one embodiment of the present invention.
Figure 2:
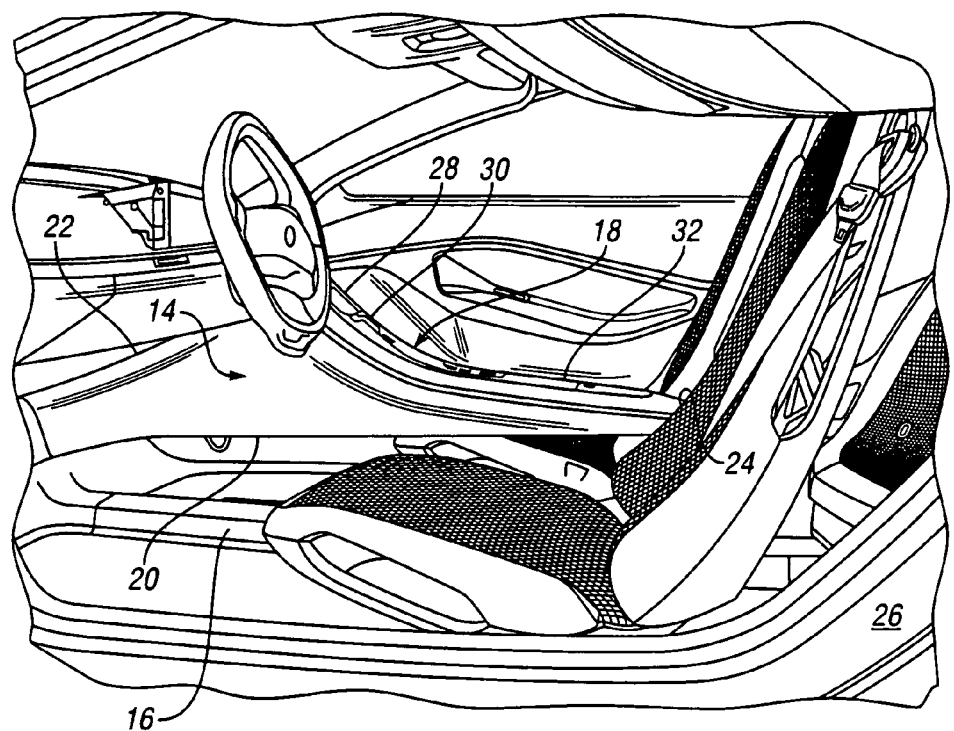
FIG. 2 is perspective, side view of the center console depicted in FIG. 1.

FIG. 1 is a perspective, top view of a center console 10 situated within a vehicle cabin 12 of vehicle 13 according to one embodiment of the present invention. Turning to FIG. 2, the center console 10 includes cantilevered body 14 and lower surface 16. The cantilevered body 14 includes an upper surface 18 and an opposing lower surface 20. The upper surface 18 can include one or more upper center console features, which are described in more detail in FIGS. 3a, 3b and 3c. The opposing lower surface 20 can include one or more center console features. Additionally, the lower surface 16 can include one or more lower center console features, which is described in more detail in FIG. 4. In certain embodiments, one or more center console features are mounted to a center console surface.

As depicted in FIG. 2, the lower surface 16 is disposed vertically apart from the upper surface 18. As one non-limiting advantage of such a configuration, a vehicle occupant has access to the one or more upper and lower center console features. In certain embodiments, the vehicle occupant has simultaneous access to the one or more upper and lower center console features.

The cantilevered body 14 includes a supported end 22 and a cantilevered end 24. In the embodiment depicted in FIG. 2, the cantilevered body 14 projects towards the vehicle rear 26 from the supported end 22 to the cantilevered end 24. In certain embodiments, the supported end 22 is integrally mounted to the vehicle instrument panel 28.

In certain embodiments, at least a portion of the upper surface 18 is substantially parallel to the lower surface 16. In other embodiments, the upper surface is not substantially parallel to the lower surface.

In FIG. 2, the upper surface 18 includes a first inclined surface 30 inclined at a first angle relative to a reference plane. The upper surface 18 also includes a second inclined surface 32 inclined at a second angle relative to the reference plane. In certain embodiments, the first angle is greater than the second angle. As a non-limiting advantage of the present invention, the varied incline angles allow for the design of center console features on a certain surface based on the incline angle. For instance, a display screen can be integrated into the first inclined surface 30 of FIG. 2 since it is at angle suitable for viewing by the vehicle occupant, whereas the second inclined surface 32 may not provide an ergonomic viewing angle, but may be more suitable for other features. In certain embodiments, the first and second angles are substantially equal.

Figure 3A:
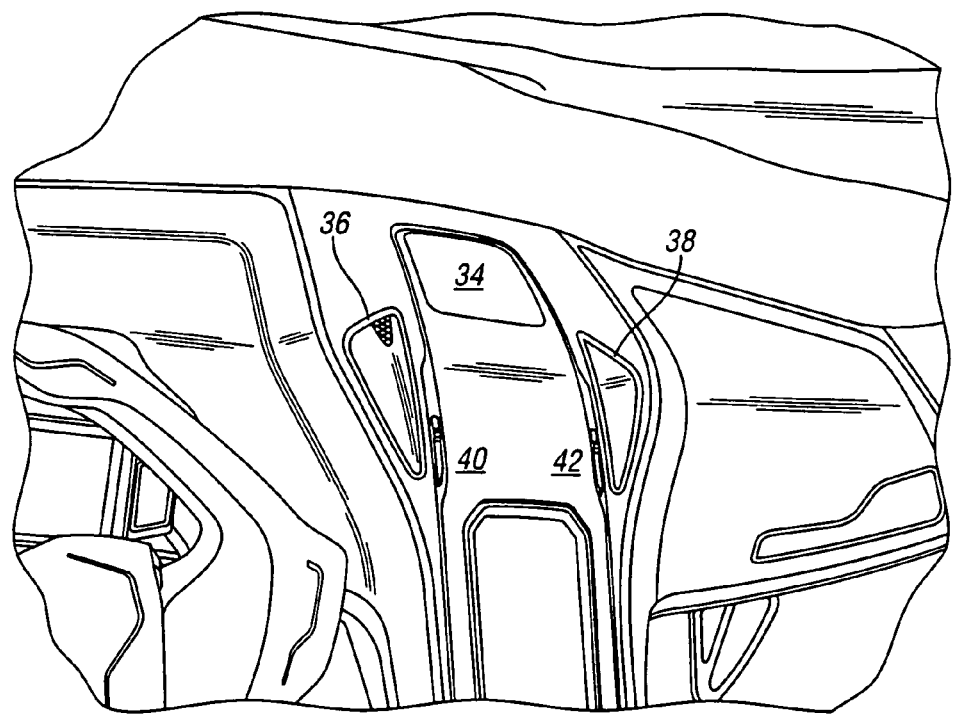
FIGS. 3a, 3b and 3c are fragmented, perspective, top views of portions of an upper surface of the center console depicted in FIGS. 1 and 2.
Figure 3B:
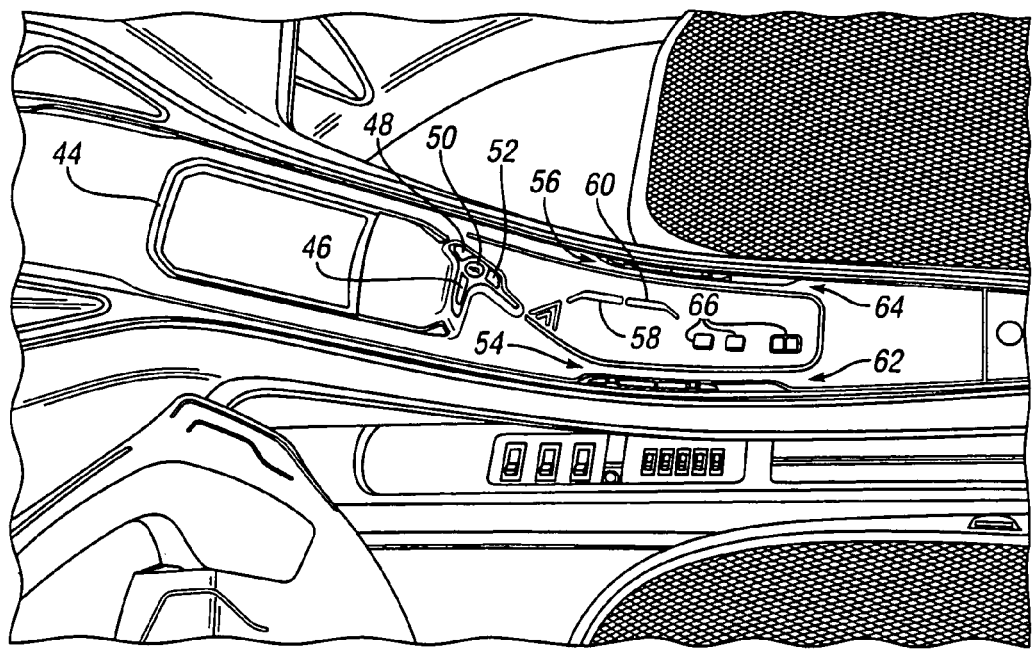
Figure 3C:
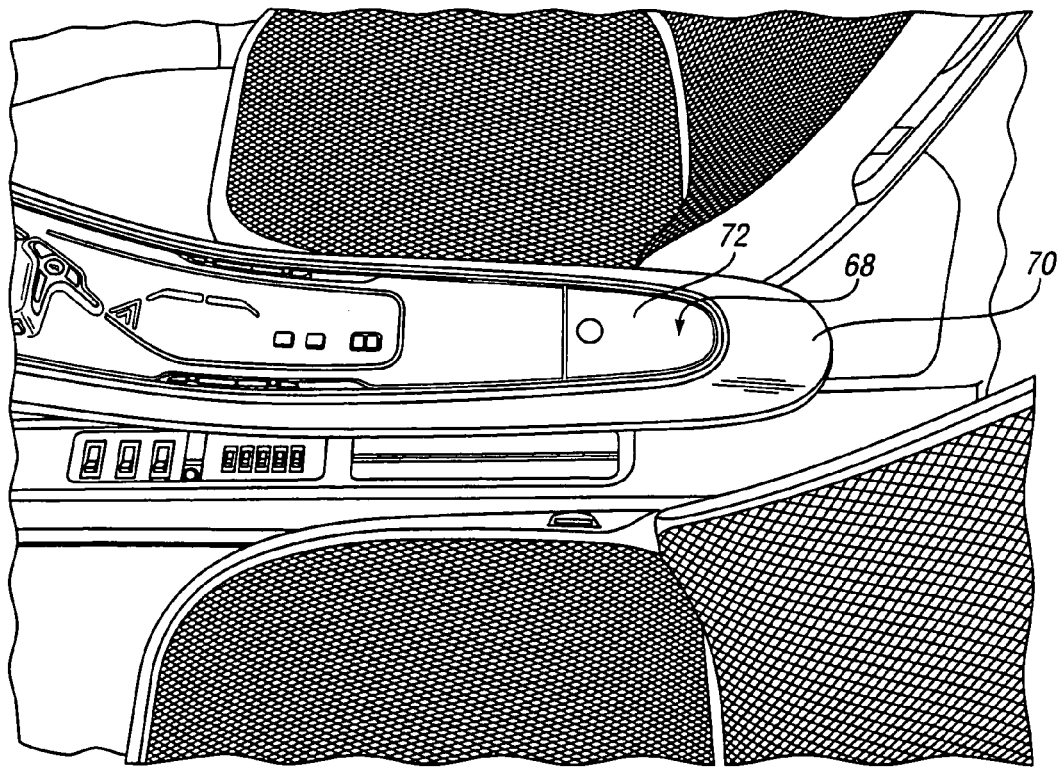

FIGS. 3a, 3b and 3c are fragmented, perspective, top views of portions of upper surface 18. The portion of the upper surface 18 depicted in FIG. 3a includes several upper center console features, which include, but are not necessarily limited to: tray 34 for storing items, e.g. loose change, left vent 36 for venting air towards the vehicle driver, right vent 38 for venting air towards the vehicle front seat passenger, left vent switch 40 for adjusting the throughput of air venting from left vent 36, and right vent switch 42 for adjusting the throughput of air venting from the right vent 38.

The portion of the upper surface 18 depicted in FIG. 3b includes several upper center console features, which include, but are not necessarily limited to: display screen 44 (e.g. LCD display screen) for displaying computer images for viewing by one or more vehicle occupants, navigation system button 46 for manipulating features of a navigation control system, cell phone button 48 for manipulating cell phone features, child lock button 50 for engaging and disengaging child safety features (e.g. child locks), child car seat control button 52 for manipulating features of a child car seat, tilt control switch 54 for adjusting the tilt angles of the front and/or rear portions of the driver seat cushion, tilt control switch for adjusting the tilt angles of the front and/or rear portions of the front passenger seat cushion, tilt control button 58 for adjusting the tilt angle of the driver seat back, tilt control button 60 for adjusting the tilt angle of the front passenger seat back, seat translation switch 62 for translating the linear position of the driver seat, and seat translation switch 64 for translating the linear position of the front passenger seat. The upper surface 18 also includes button cluster 66 wherein each button can be customized for user-defined functions, e.g. speed dial on a bluetooth enable cell phone or a garage door opening function.

The portion of the upper surface 18 depicted in FIG. 3c includes several upper center console features, which include, but are not necessarily limited to a storage compartment 68 for storing items and an arm rest 70. Additionally or alternatively, storage compartment 68 may provide or otherwise operate as a cup holder for securing one or more beverages. The upper surface 18 also includes a door 72 having a closed position, as shown in FIG. 3c, for enclosing the storage compartment 68 and an open position for permitting access to the storage compartment.

Figure 4:
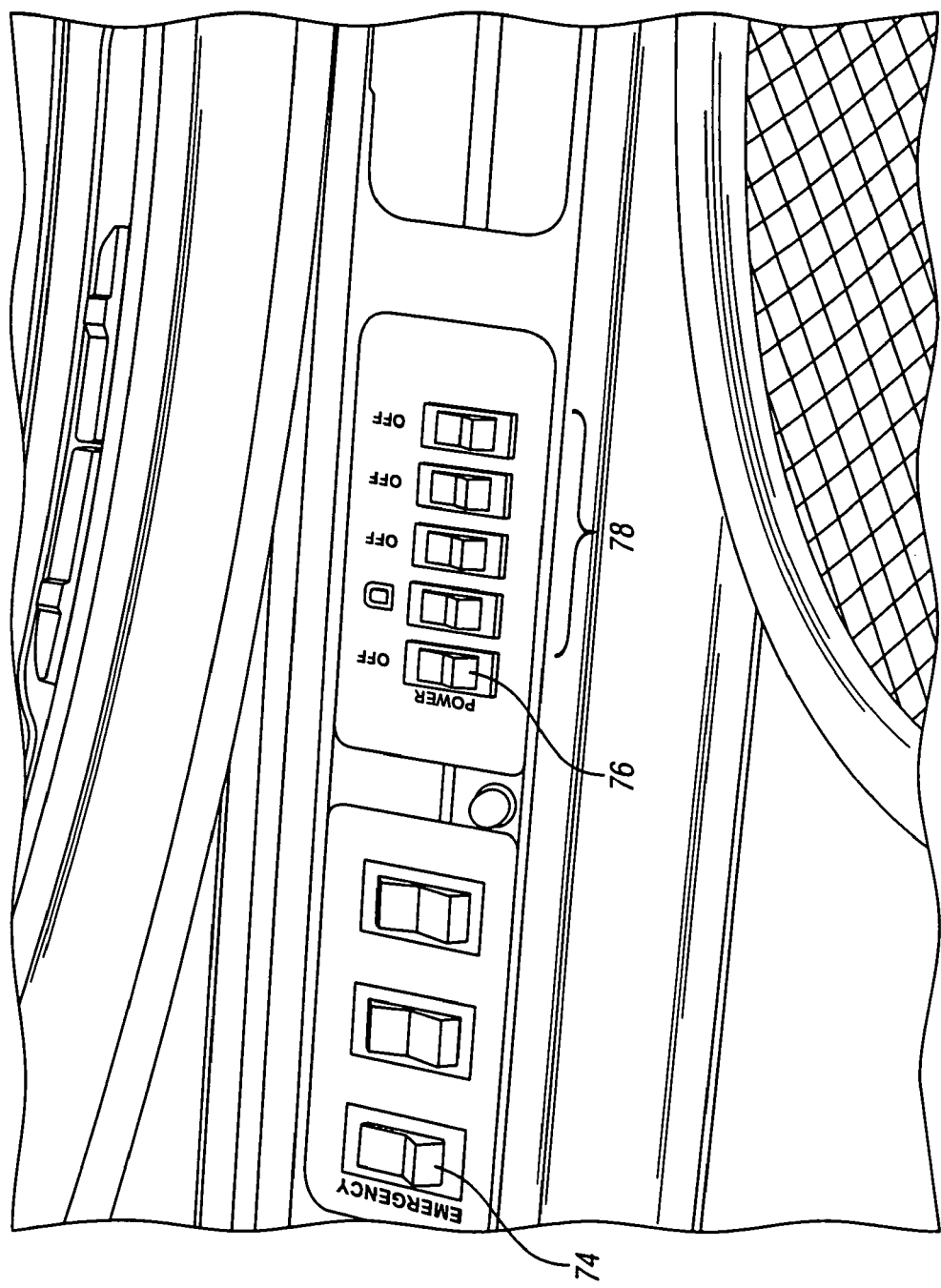
FIG. 4 is a fragmented, perspective view of a portion of a lower surface of the center console depicted in FIGS. 1 and 2.

FIG. 4 is a fragmented, perspective view of a portion of the lower surface 16 of the center console 10 depicted in FIGS. 1 and 2. Lower surface 16 includes several lower center console features, which include, but are not necessarily limited to: an emergency brake lever or switch 74 for engaging and disengaging the emergency brake, a power switch 76 for turning the vehicle power on and off, and one or more other customizable on/off switches 78.

It should be appreciated that the center console features are not necessarily limited in the application to a specific center console surface, and each feature can be applied to one or more or none of the center console surfaces depending on the implementation of the present invention. Moreover, the placement of any center console position is not limited by the specific embodiments described herein.

While the best mode for carrying out the invention has been described in detail, those familiar with the art to which this invention relates will recognize various alternative designs and embodiments for practicing the invention as defined by the following claims.

What is claimed is:

1. A vehicle center console comprising:
   a fixed cantilevered body having an upper surface including one or more upper center console features, the cantilevered body including a supported end integrally mounted to a vehicle instrument panel and a cantilevered end, the cantilevered body projecting towards the vehicle rear from the supported end to the cantilevered end; and
   a lower surface including one or more lower center console features, the lower surface disposed vertically apart from and underneath at least a portion of the upper surface such that a vehicle occupant has access to the one or more upper and lower center console features.

2. The vehicle center console of claim 1, wherein at least a portion of the upper surface is substantially parallel to the lower surface.

3. The vehicle center console of claim 1, wherein the upper surface include a first inclined surface inclined at a first angle relative to a reference plane and a second inclined surface inclined at a second angle relative to the reference plane.

4. The vehicle center console of claim 3, wherein the first angle is greater than the second angle.

5. The vehicle center console of claim 1, wherein the one or more upper center console features are mounted to the upper surface, and the one or more lower vehicle console features are mounted to the lower surface.

6. The vehicle center console of claim 1, wherein the one or more upper center console features include a cell phone button and a navigation system button.

7. The vehicle center console of claim 1, wherein the vehicle occupant has simultaneous access to the one or more upper and lower center console features.

8. The vehicle center console of claim 1, wherein the cantilevered body includes a lower cantilevered surface opposing the upper surface and facing the lower surface.

9. The vehicle center console of claim 8, wherein the lower cantilevered surface includes one or more center console features accessible by the vehicle occupant.

10. The vehicle center console of claim 1, wherein the one or more upper center console features includes a storage tray.

11. The vehicle center console of claim 1, wherein the one or more upper center console features includes a one or more switches.

12. The vehicle center console of claim 1, wherein the cantilevered body includes a storage compartment for storing items and the upper surface includes a door having a closed position for at least partially enclosing the storage compartment and an open position for permitting access to the storage compartment.

13. The vehicle center console of claim 12, wherein the upper surface includes one or more switches for switching the door from one of the open or closed positions to the other position.

14. The vehicle center console of claim 1, wherein at least either of the one or more upper and lower center console features includes a cup holder.

15. A vehicle center console comprising:
a cantilevered body having an upper surface including one or more upper center console features, the upper surface including a first inclined surface inclined at a first angle relative to a reference plane and a second inclined surface inclined at a second angle relative to the reference plane, the first angle being greater than the second angle, the cantilevered body including a supported end integrally mounted to a vehicle instrument panel and a cantilevered end, the cantilevered body projecting towards the vehicle rear from the supported end to the cantilevered end; and
a lower surface including one or more lower center console features, the lower surface disposed vertically apart from and underneath at least a portion of the upper surface such that a vehicle occupant has simultaneous access to the one or more upper and lower center console features.

16. A vehicle center console comprising:
a fixed cantilevered body having an upper surface, the upper surface including one or more upper center console features; and
a lower surface including one or more lower center console features, the lower surface disposed vertically apart from and underneath at least a portion of the upper surface such that a vehicle occupant has access to the one or more upper and lower center console features,
wherein the cantilevered body includes a supported end and a cantilevered end integrally mounted to a vehicle instrument panel, the cantilevered body projecting towards the vehicle rear from the supported end to the cantilevered end.

* * * * *